(12) United States Patent
Zimmer et al.

(10) Patent No.: US 7,272,890 B2
(45) Date of Patent: Sep. 25, 2007

(54) METHOD FOR PRODUCING A WIPER ARM

(75) Inventors: Joachim Zimmer, Sasbach (DE); Harald Rapp, Buehl (DE); Frans Penne, Aalst (BE)

(73) Assignee: Robert Bosch GmbH, Stuttgart (DE)

( * ) Notice: Subject to any disclaimer, the term of this patent is extended or adjusted under 35 U.S.C. 154(b) by 520 days.

(21) Appl. No.: 10/362,608

(22) PCT Filed: Jun. 1, 2002

(86) PCT No.: PCT/DE02/02019

§ 371 (c)(1),
(2), (4) Date: Jun. 12, 2003

(87) PCT Pub. No.: WO03/004323

PCT Pub. Date: Jan. 16, 2003

(65) Prior Publication Data

US 2004/0025282 A1    Feb. 12, 2004

(30) Foreign Application Priority Data

Jul. 2, 2001    (DE) .................... 101 31 580

(51) Int. Cl.
*B60S 1/32*    (2006.01)
*B60S 1/34*    (2006.01)

(52) U.S. Cl. ............. 29/897.2; 29/428; 15/250.351; 15/250.352

(58) Field of Classification Search ........ 15/250.351, 15/250.352; 29/505, 509, 428, 897.2
See application file for complete search history.

(56) References Cited

U.S. PATENT DOCUMENTS

| | | | | |
|---|---|---|---|---|
| 2,295,620 | A | * | 9/1942 | Zaiger .................. 15/250.202 |
| 2,353,208 | A | * | 7/1944 | Whitted ................ 15/250.352 |
| 3,427,676 | A | * | 2/1969 | Riester ................. 15/250.352 |
| 6,886,232 | B2 | * | 5/2005 | Kessler ..................... 29/412 |

FOREIGN PATENT DOCUMENTS

| | | |
|---|---|---|
| DE | 41 36 938 A | 11/1992 |
| EP | 0575241 * | 12/1993 |
| EP | 0 579 550 A | 1/1994 |
| EP | 1 095 830 A | 5/2001 |
| WO | 01 62560 A | 8/2001 |

* cited by examiner

*Primary Examiner*—Gary K. Graham
(74) *Attorney, Agent, or Firm*—Michael J. Striker

(57) ABSTRACT

A wiper arm (10), in particular for a wiper apparatus of a motor vehicle, having at least one joint part (12) and/or one fastening part (18) with a base (30) is proposed, from which at least one and preferably two lateral flanks (32) extend at an angle (A), in particular approximately plumb, wherein at least one lateral flank (32) has at least one locking cam (40) and extends outward approximately from the edge (38), remote from the base, of the lateral flank (32) and is embodied integrally with the lateral flank (32), wherein the locking cam (40) is disposed in concealed fashion in the side profile. A method for producing a wiper arm (10) of this kind is also disclosed.

2 Claims, 4 Drawing Sheets

METHOD FOR PRODUCING A WIPER ARM

PRIOR ART

Figure 1:
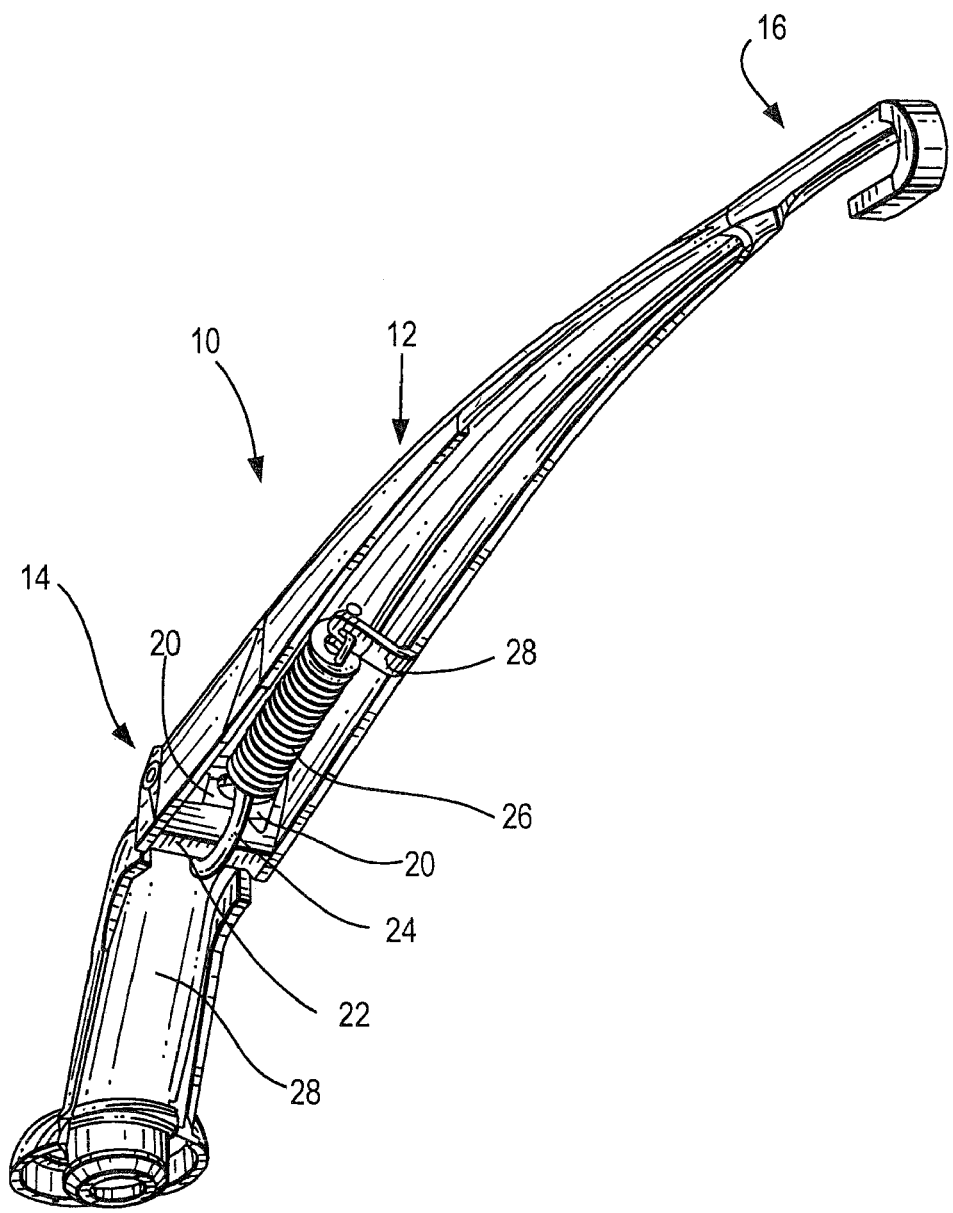

The invention described and claimed hereinbelow is also described in German Patent Application DE 101 31 580.5 filed on Jul. 2, 2001. This German Patent Application provides the basis for a claim of priority of invention under 35 U.S.C. 119(a)-(d).

BACKGROUND OF THE INVENTION

Numerous wiper arms for motor vehicles are already known, for instance from European Patent Disclosure EP 1 095 830, that comprise a joint part and a fastening part that are rotatably joined to one another via a bolt. The maximum possible rotational angle between the two parts is defined via locking cams and stop elements.

The joint part is elongated in shape and essentially U-shaped in cross section and therefore has a base and two lateral flanks disposed approximately orthogonally to the base. At the edges, remote from the base, of the lateral flanks, tabs are stamped out and bent and act as locking cams for limiting the rotational angle.

From the same reference, it is known to embody locking cams in the interior of the U-shaped cross section in the form of cylindrical pegs, which are produced from outside by suitable embossing.

Since the locking cams protrude from the plane that is formed by the edges, remote from the base, of the lateral flanks, an unfavorable flow course results, which adversely affects wind noise of the vehicle, particularly at high speeds.

SUMMARY OF THE INVENTION

In accordance with the present invention a wiper arm is proposed for a wiper apparatus of a motor vehicle, which has at least one joint part and/or one fastening part with a base, from which at least one and preferably two lateral flanks extend at an angle, in particular approximately plumb. wherein at least one lateral flank has at least one locking cam and extends outward approximately from the edge, remote from the base, of the lateral flank and is embodied integrally with the lateral flank characterized in that the locking cam is disposed in concealed fashion in the side profile.

At least one joint part and/or one fastening part with a base, from which at least one and preferably two lateral flanks extend at an angle, in particular approximately plumb, wherein at least one lateral flank has at least one locking cam and extends outward approximately from the edge, remote from the base, of the lateral flank and is embodied integrally with the lateral flank characterized in that the locking cam is disposed in concealed fashion in the side profile.

The wiper arm of the invention having the characteristics of the main claim has the advantage that because the locking cam is concealed in the side profile, it is not visible in the side profile, and troublesome eddies in the onflow region of the wiper arm are avoided. As a result, air resistance and wind noise of the wiper arm are both reduced. If the locking cam is furthermore embodied integrally with one lateral flank of the wiper arm, it is possible to dispense with additional fastening means.

The wiper arm of the invention has the advantage that because the locking cam is concealed in the side profile, it is not visible in the side profile, and troublesome eddies in the onflow region of the wiper arm are avoided. As a result, air resistance and wind noise of the wiper arm are both reduced. If the locking cam is further embodied integrally with one lateral flank of the wiper arm, it is possible to dispose with additional fastening means.

It is especially advantageous if the locking cam is essentially block-shaped and is formed with sharp edges on an outer edge of the lateral flank, so that the outer edge extends unimpeded. Because of the block-shaped embodiment of the locking cam, the locking cam can rest on the lateral flank of the wiper arm over a wide region, making the connection very strong.

It is especially advantageous if the essentially block-shaped locking cam extends approximately parallel to the base of the wiper arm and is spaced apart from the edge, remote from the base, of the lateral flank, so that the locking cam is disposed in the interior of the U-shaped cross section.

If the wiper arm comprises at least one joint part of essentially elongated shape, connected on one end to a fastening part that can be connected to a wiper shaft that can be driven to swing back and forth, then it can be produced simply and economically from only a few parts.

It is especially advantageous if the joint part is rotatably connected to a fastening part, and the joint part has a stop element, cooperating with at least one locking cam, for limiting the rotational angle. In this way, the rotational angle between the fastening part and the joint part can be defined without requiring constructions that impede the flow course in the region of the wiper arm.

If furthermore the locking cam is upset, then the material in the region of the locking cam is solidified, where high strength is required. As a result of the upsetting, the locking cam is moreover positioned precisely, minimizing tolerances.

The wiper apparatus of the invention with a wiper arm has the advantage that because of the concealed locking cams, it is especially streamlined and can therefore also be used in vehicles at relatively high speeds.

The method of the invention having the characteristics of claim 8 is especially advantageous, since after the contour of the joint part with the locking cams has been stamped out of a metal sheet, with subsequent bending over and upsetting of the locking cams and ensuing sharp-edged forming of the edge of the lateral flank, a simple method is available with which wiper arms whose locking cams are concealed can be produced.

BREIF DESCRIPTION OF THE DRAWINGS

Figure 2:
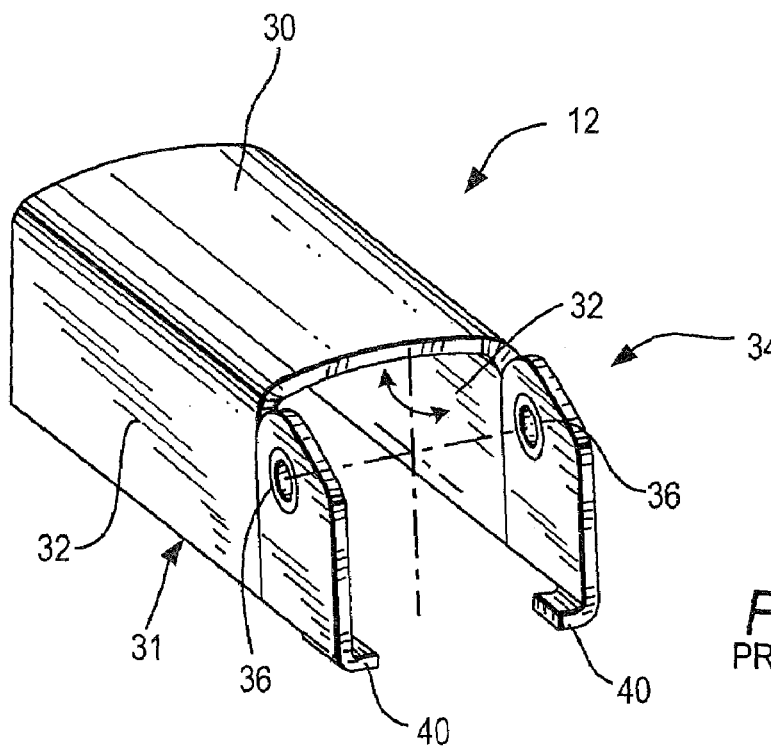
Figure 3:
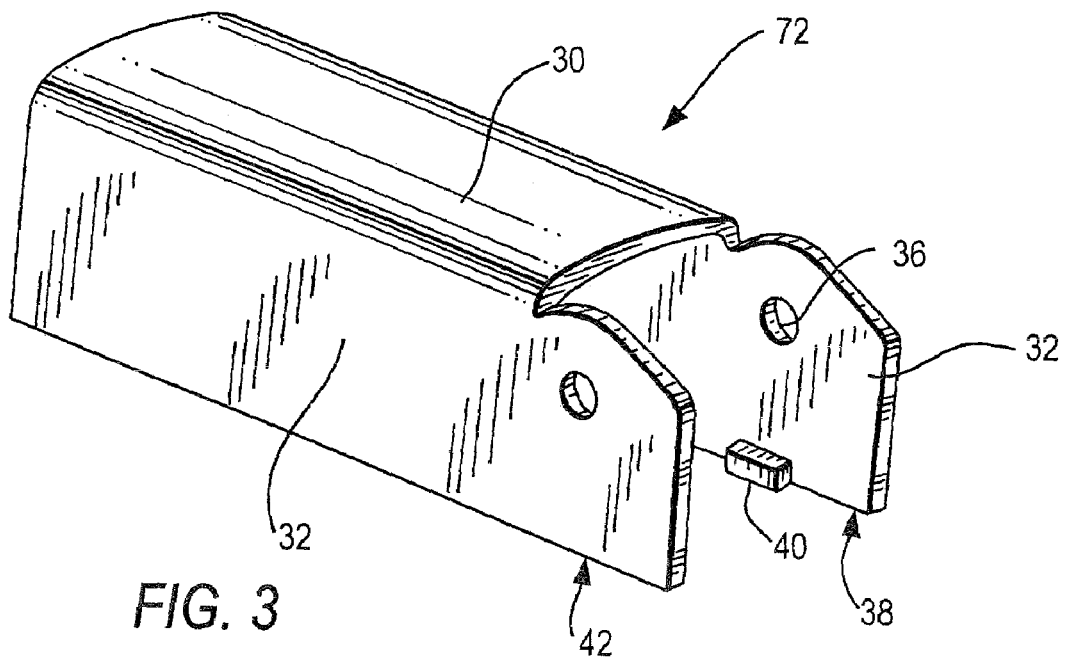
Figures 1, 4A:
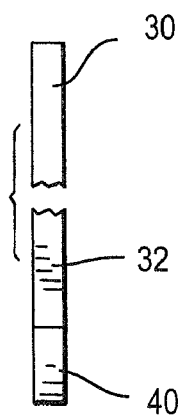
Figures 2, 4A:
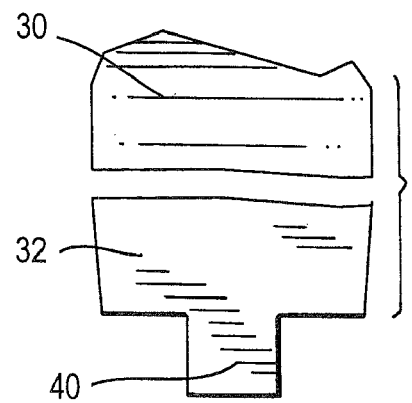
Figures 1, 4B:
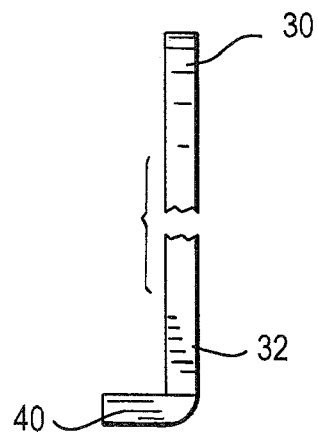
Figures 2, 4B:
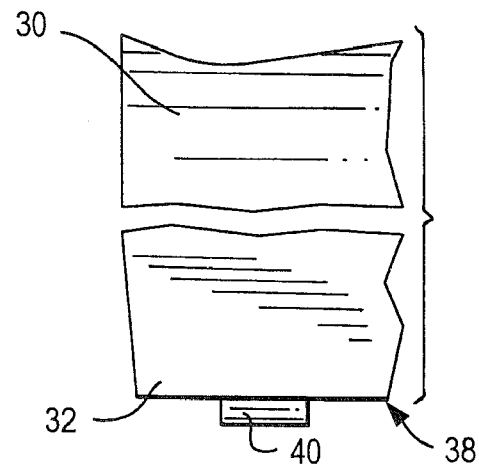
Figures 1, 4C:
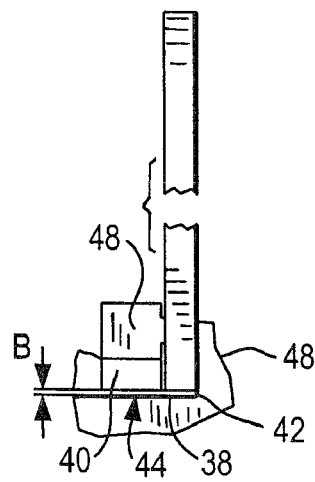
Figures 2, 4C:
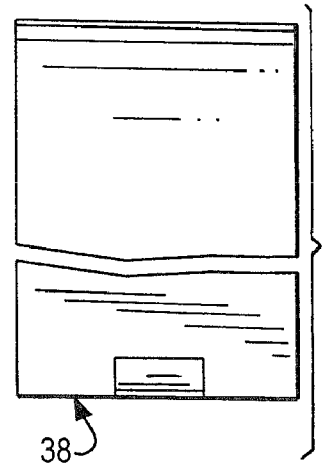
Figures 1, 4D:
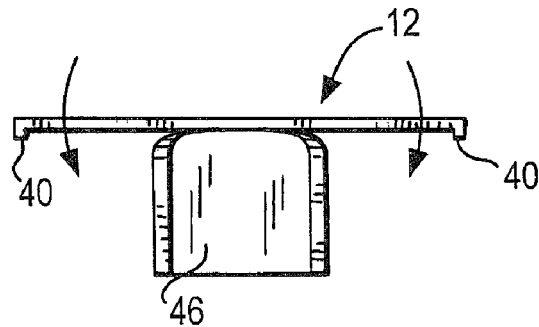
Figures 2, 4D:
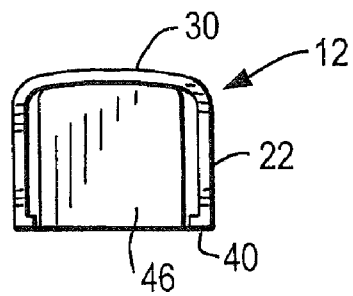
Figures 3, 4D:
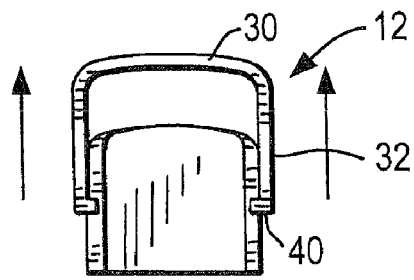

FIG. 1, a wiper arm of the prior art in a perspective view;
FIG. 2, the end of a joint part of the prior art in a perspective view;
FIG. 3, the end of a joint part of a wiper arm of the invention in a perspective view; and
FIGS. 4*a*-4*d*, a method of the invention, shown schematically.

DESCRIPTION OF THE EXEMPLARY EMBODIMENT

In FIG. 1, a wiper arm 10 of the invention is shown in perspective with its most important elements. It essentially comprises a joint part 12 of elongated shape, which has both a first end 14 and a second end 16. The first end 14 is connected rotatably to a fastening part 18 by a linking means 20, such as a bolt. The second end 16 can be connected to a wiper blade, not shown. The second end 16 can also carry a wiper rod to which the wiper blade is secured. In that case, the joint part 12 carries the wiper blade indirectly.

The fastening part 18 also has a fastening means 22, at which, via a C-bracket 24, a tension means 26 is pivotably connected that is secured by its other end to a tab 28 on the joint part 12. As a result, the joint part can be rotated about the linking means 20, and the requisite force is determined by the properties of the tension means 26.

FIG. 2 shows the first end 14 of a joint part 12 of the prior art in perspective. The joint part 12 is U-shaped in cross section, with a base 30 and two lateral flanks 32. The base 30 is recessed in the region of rotation 34, and as a result the two lateral flanks 32 protrude like tabs from the U-shaped cross section. The lateral flanks 32 have a bore 36, in which the bolt 20 is seated after assembly. The lateral flanks 32 each have one locking cam 40, on their edge 38 remote from the base, and these locking cams serve to limit the rotational angle, via stop elements that are disposed on the fastening part 18.

In the production of a wiper arm of this kind, a metal sheet is first stamped in a plane that includes the base 30, the lateral flanks 32, and the locking cams 40. Next, the sheet is bent over a core, so that the two lateral flanks 32 form an angle A, which is typically approximately a right angle, with the base 30. The base 30 itself is bent in the form of a hump in the process. The core is then removed, and the locking cams 40 are bent inward, that is, into the interior of the U-shaped profile.

FIG. 3 shows the first end 14 of a joint part 12 of a wiper arm 10 of the invention in perspective. The two lateral flanks 32 are joined to one another by the humped base 30. The block-shaped locking cam 40 is disposed on the edge 38, remote from the base, of the lateral flank 32. Naturally, locking cams 40 may be disposed all along the edge 38, remote from the base, of the lateral flank 32. They can also have some other shape, such as that of a half-cylinder. The face of the locking element 40, which is remote from the base 30 of the joint part 12, is then located in the same plane as the edge 38, remote from the base, of the lateral flank 32. In this way, the locking cam 40 is concealed in the side profile.

The edge of the lateral flank 32 that is remote from the base 30 and from the locking cam 40, hereinafter designated as the outer edge 42 of the lateral flank 32, is entirely unimpeded.

It is understood that the locking cam 40 may also be shifted somewhat toward the base 30, so that a spacing B results between the edge 38 and the face, remote from the base, of the locking cam 40.

In FIGS. 4a-4d, the essential steps of the method of the invention are shown.

In a first step 4a, the contour of the joint part 12 with the lateral flanks 32 and the locking cams 40 is stamped out of a flat metal stamping sheet.

Next, in a second step 4b, the locking cam 40 is bent out of the plane of the stamping sheet by approximately 90°. This locking cam 40 then protrudes past the edge 38, remote from the base, of the lateral flank 32.

In the third step 4c, the locking cams 40 are upset in the direction of the arrow 44 by means of a die 48, that has the form of the locking cams 40. As a result, the stamping sheet is solidified in the region of the locking cam 40, and the locking cam is shifted outward past the edge 38. By means of a suitable die 48, this can also proceed so far that the locking cam 40 is spaced apart from the edge 38 by the spacing B. In this step, the locking cam 40 can also be stamped out again to size or cut to size.

In a final step 4d, the metal sheet with the finished locking cams is bent into the U shape around a tool core 46. In the region of the locking cams 40, the tool core 46 has suitable recesses, so that after the bending, the U-shaped joint part can easily be pulled off the tool core 46.

What is claimed is:

1. A method for producing a wiper arm for a wiper apparatus of a motor vehicle, comprising the steps of providing at least one part selected from the group consisting of a joint part and a fastening part; providing in said at least one part a base and at least one lateral flank extending from said base at an angle; providing in said at least one lateral flank at least one locking cam which extends inwardly from an edge remote from said base of said at least one lateral flank; and disposing inwardly and configured integrally with said one lateral flank, said at least one locking cam in a concealed fashion in said at least one part in a side profile so that it can not be seen from outside of said at least one part; stamping out a contour of the at least one part with the locking cam from a metal sheet; bending the locking cam over out of a plane of the sheet by approximately 90°; upsetting the locking cam; sharp-edged forming of the edge of the lateral flank; and bending the lateral flank over by an angle creating a profile that is approximately U-shaped in cross-section.

2. A method as defined in claim 1; and further comprising rotatably connecting the at least one part with the other part from the group; and defining at least one limit of a rotational angle between the joint part and the fastening part by the locking cam.

* * * * *